: 2,989,529
Patented June 20, 1961

2,989,529
BASICALLY SUBSTITUTED AZAPHENOTHIAZINES
Wilhelm Alfons Schuler, Bad Homburg vor der Hohe, Germany, assignor to Deutsche Gold- und Silber-Scheideanstalt vormals Roessler, Frankfurt am Main, Germany
No Drawing. Filed June 11, 1958, Ser. No. 741,241
Claims priority, application Germany June 15, 1957
5 Claims. (Cl. 260—243)

The present invention relates to novel basically substituted 1-azaphenothiazines of the general formula

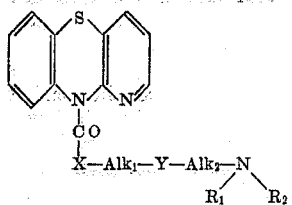

In such formula the benzene can if desired be substituted, for example, with hydroxy groups, halogen, such as Cl, lower alkyl groups, such as methyl, as well as with lower alkoxy groups and the like, X and Y represent oxygen or sulfur, $Alk_1$ and $Alk_2$ represent straight or branched chained lower alkylene radicals, $R_1$ and $R_2$ are lower substituted or unsubstituted aliphatic radicals, preferably lower alkyl radicals which also can be closed to form a ring, such as a piperidine or pyrrolidine ring. Such ring if desired can be interrupted by a hetero atom such as in the case of a morpholine or piperazine ring. Radicals $R_1$ or $R_2$ can also be closed with $Alk_2$ to form a ring such as the piperidine or pyrrolidine ring. The ether-ester compounds according to the invention and their non-toxic acid addition salts possess good pharmaceutical activity, particularly as cough repressing agents. For example, the piperidino-ethoxy-ethyl ester of 1-azaphenothiazine carboxylic acid when tested on guinea pigs showed an E.D. 50 of 15 mg./kg.±.9 upon subcutaneous injection. Practically as good a cough repressant action was also obtained with the diisopropylaminoethoxy ethyl ester of 1-azaphenothiazine carboxylic acid. Also the diethylamino ethoxy ethyl ester and the diethylaminoethyl thioethyl ester of 1-azaphenothiazine carboxylic acids were distinctly active as cough repressants, even though less strong than the first two ether esters mentioned. The above tests were carried out using between 18–24 guinea pigs for each.

In comparison, tests carried out with dimethylaminoisopropyl-1-azaphenothiazine (the only 1-azaphenothiazine derivative which has as yet been placed upon the market) showed that this compound had practically no cough repressant action in non-toxic doses.

Tests carried out with (+)-3-methoxy-N-methylmorphinane-hydrobromide, a commercially available cough repressant showed an E.D. 50 of 25 mg./kg.±8.1. The above mentioned piperidino-ethoxy-ethyl ester compound and the above mentioned diisopropylamino-ethyl thioethyl ester compound were respectively 1.7 and 1.4 times as efficient as the morphinane hydrobromide compound.

The compounds according to the invention can be prepared from a 1-azaphenothiazine derivative of the formula

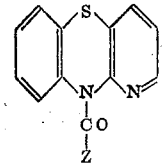

wherein Z represents a halogen or an alkoxy group. Such starting compounds can be prepared by reacting 1-azaphenothiazine with carbonic acid dihalides as described in application S.N. 621,013, filed November 8, 1956, now U.S. Patent No. 2,934,533, or by reacting a carbonic acid dihalide first with an alkanol to produce a compound of the formula Hal—COOAlk and reacting this compound with 1-azaphenothiazine.

These compounds are reacted with a compound of the formula

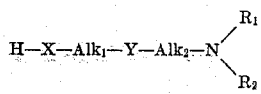

preferably at an elevated temperature if necessary in the presence of an alkaline condensing agent with splitting off of hydrohalide or the alcohol corresponding to the alkoxy group.

It is also possible to produce the compounds according to the invention by reacting the 1-azaphenothiazine derivative of the formula

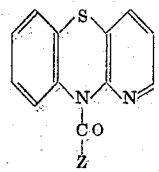

with a compound of the formula $$H—X—Alk_1—Y—Alk_2—Z$$

to produce a compound of the formula

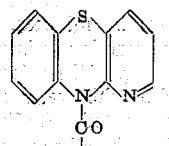

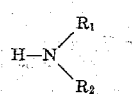

and then reacting such compound with a compound of the formula

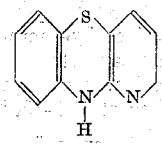

with splitting off of a hydrogen halide or alcohol.

A further manner of preparing the compound according to the invention consists in reacting 1-azaphenothiazine of the formula

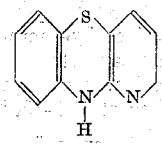

with a compound of the formula $$Z—CO—X—Alk_1—Y—Alk_2—Z$$

and then reacting the resulting condensate with a compound of the formula

The following examples will serve to illustrate several embodiments according to the invention:

*Example 1*

13.1 parts of 1-azaphenothiazine carboxylic acid chloride were introduced into 150 parts of chlorobenzene and 20.2 parts of diethylaminoethoxy-ethanol added thereto. The mixture was then boiled for 15 minutes under reflux. After cooling, water was added to the reaction mixture and dilute HCl was added thereto to provide a pH of about 5-6. The aqueous phase was separated off, caustic soda solution added thereto and then extracted with ether. The ether extract was washed with water, then dried and the ether distilled off. 17 parts of the diethylaminoethyl ester of 1-azaphenothiazine carboxylic acid were obtained. This compound was then dissolved in isopropanol and the solution neutralized with isopropanolic HCl. The monohydrochloride salt which precipitated out after recrystallization had a melting point of 126 to 127° C.

*Example 2*

8.5 parts of 1-azaphenothiazine carboxylic acid chloride and 14 parts of piperidino-ethoxy-ethanol were introduced into 100 parts of chlorobenzene and the mixture boiled under reflux for 5 minutes. After cooling off the precipitated hydrochloride salt of piperidino-ethoxy-ethanol was filtered off on a suction filter. Water was added to the filtrate and the pH thereof adjusted to 5 to 6 with dilute HCl. The aqueous phase was then removed, a caustic soda solution added thereto and then extracted with ether. The ethyl extract was washed with water, then dried with potash and the ether distilled off. 9.4 parts of the piperidino-ethoxy-ethyl ester of 1-azaphenothiazine carboxylic acid were obtained. This product was dissolved in 20 parts of isopropanol and the solution neutralized with isopropanolic HCl. The monohydrochloride which precipitated out after recrystallization from isopropanol had a melting point of 160-161° C.

*Example 3*

26 parts of 1-azaphenothiazine carboxylic acid chloride and 37 parts of diethylamino-ethyl-mercaptoethanol were introduced into 300 parts of chlorobenzene and the mixture boiled under reflux for 30 minutes. After cooling, water was added to the reaction mixture and it was washed three times with water. The chlorobenzene phase was adjusted to a pH of 5 with water and dilute HCl. The aqueous phase was separated off, alkalized and then extracted with ether. After the ether was distilled off an almost quantitative yield of diethylaminoethyl-mercaptoethyl ester of 1-azaphenothiazine carboxylic acid remained as a residue. It was dissolved in 50 cc. of water and the solution neutralized with isopropanolic HCl. After the addition of a little acetone and ether the monohydrochloride salt crystallized out. After recrystallization from an isopropanol-acetone-ether mixture the monohydrochloride salt melted at 118-121° C.

*Example 4*

When the procedure of Example 3 was repeated, except that diisopropylaminoethyl-mercaptoethanol was used instead of the diethylaminoethyl-mercaptoethanol, the diisopropylaminoethyl-mercaptoethyl ester of 1-azaphenothiazine carboxylic acid was obtained, the monohydrochloride of which melted at 104-108° C.

*Example 5*

26 parts of 1-azaphenothiazine carboxylic acid chloride were dissolved in 300 parts of chlorobenzene and 44.2 parts of diisopropylaminoethyl-mercaptoethyl-mercaptan added to such solution. The mixture was boiled under reflux for 30 minutes. After cooling off, water was added to the reaction mixture and it was washed three times with water. The organic phase was separated off and adjusted to a pH of 4 with water and dilute HCl. The aqueous phase was then separated off from the organic phase, alkalized and then extracted with ether. After the ether was distilled off from the extract a 78% yield of the diisopropylaminoethyl-mercaptoethyl-thioester of 1-azaphenothiazine carboxylic acid remained as a residue. It was dissolved in 50 cc. of isopropanol and the solution adjusted to a pH of 4-5 with isopropanolic HCl. Upon addition of a little acetone and ether the corresponding monohydrochloride precipitated out. This salt had a melting point of 144-146° C.

*Example 6*

12.9 parts of 1-azaphenothiazine carboxylic acid methyl ester (M.P. 133-135° C.) were heated in 300 parts of xylene with 7.5 g. β-chloro-β'-hydroxy-diethyl ether (B.P. 180-185° C.) and 0.2 g. of sodium to boiling for 3 hours. During such boiling the methyl alcohol formed together with about 150 cc. of xylene distilled off. Thereafter 6 parts of diisopropylamine and 16.5 parts of powdered potash were added and the mixture boiled for 6 hours under reflux while stirring. After cooling, the salt mixture was filtered off and the filtrate extracted with aqueous HCl. The aqueous extract was alkalized and extracted with ether. The ether extract was dried with potash and then evaporated to dryness.

10.8 parts of crude diisopropylaminoethoxy ethyl ester of 1-azaphenothiazine carboxylic acid were obtained. The crude product was dissolved in isopropanol and the solution neutralized with isopropanolic HCl. The monohydrochloride which is thus obtained melts at 126-129° C. after recrystallization from isopropanol.

I claim:

1. A compound selected from the group consisting of free bases of the formula

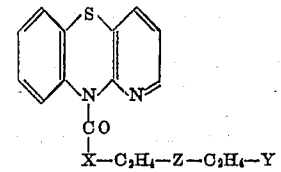

X—C₂H₄—Z—C₂H₄—Y wherein X and Z are selected from the group consisting of oxygen and sulfur atoms and Y is a radical selected from the group consisting of

1-piperidino and 1-pyrrolidino, $R_1$ and $R_2$ are lower alkyl and the non-toxic inorganic acid addition salts thereof.

2. A compound of the formula

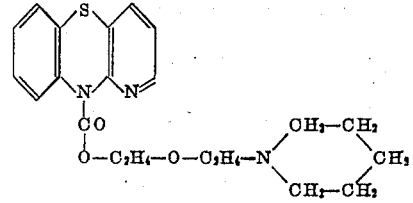

3. A compound of the formula

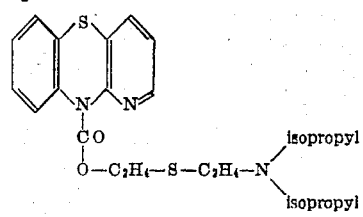

4. A compound of the formula

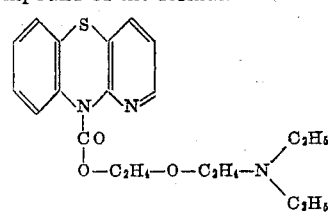

5. A compound of the formula
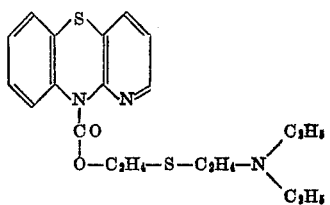
References Cited in the file of this patent
UNITED STATES PATENTS
2,778,824 Von Seemann _____ Jan. 22, 1957
2,789,978 Rath _____ Apr. 23, 1957
FOREIGN PATENTS
515,180 Canada _____ Aug. 2, 1955
OTHER REFERENCES
Schlichtegroll: Arzn. Forsch., vol. 7, pp. 237–52 (April 1957).